United States Patent
Bedini

(10) Patent No.: US 6,392,370 B1
(45) Date of Patent: May 21, 2002

(54) DEVICE AND METHOD OF A BACK EMF PERMANENT ELECTROMAGNETIC MOTOR GENERATOR

(75) Inventor: John C. Bedini, Coeur d'Alene, ID (US)

(73) Assignee: Bedini Technology, Inc., Coeur d'Alene, ID (US)

( * ) Notice: Subject to any disclaimer, the term of this patent is extended or adjusted under 35 U.S.C. 154(b) by 0 days.

(21) Appl. No.: 09/483,715

(22) Filed: Jan. 13, 2000

(51) Int. Cl.[7] ............................................... H02K 47/14
(52) U.S. Cl. ........................ 318/140; 318/492; 318/538; 310/113
(58) Field of Search ............................... 318/140, 148, 318/151, 153, 459, 491, 492, 538; 310/152, 156, 112, 113

(56) References Cited

U.S. PATENT DOCUMENTS

| | | |
|---|---|---|
| 2,560,260 A | 7/1951 | Sturtevant et al. |
| 2,613,246 A | 10/1952 | Spodig |
| 2,974,981 A | 3/1961 | Vervest et al. |
| 4,222,021 A | 9/1980 | Bunker, Jr. |
| 4,265,746 A | 5/1981 | Zimmerman, Sr. et al. |
| 4,265,754 A | 5/1981 | Menold |
| 4,417,167 A | 11/1983 | Ishii et al. |
| 4,423,343 A | 12/1983 | Field, II |
| 4,429,263 A | 1/1984 | Müller |
| 4,433,260 A | 2/1984 | Weisbord et al. |
| 4,488,075 A | 12/1984 | DeCesare |
| RE31,950 E | 7/1985 | Binns |
| 4,536,230 A | 8/1985 | Landa et al. |
| 4,761,590 A | 8/1988 | Kaszman |
| 4,916,346 A | 4/1990 | Kliman |
| 4,972,112 A | 11/1990 | Kim |
| 4,980,595 A | 12/1990 | Arora |
| 5,130,595 A | 7/1992 | Arora |
| 5,177,054 A | 1/1993 | Lloyd et al. |
| 5,227,702 A | 7/1993 | Nahirney |
| 5,334,894 A | 8/1994 | Nakagawa |
| 5,350,958 A | 9/1994 | Ohnishi |
| 5,356,534 A | 10/1994 | Zimmerman et al. |

(List continued on next page.)

FOREIGN PATENT DOCUMENTS

| | | |
|---|---|---|
| EP | 0 462 340 A1 | 12/1991 |
| EP | 0 932 248 A1 | 7/1999 |
| GB | 2 224 398 A | 5/1990 |
| WO | WO 99/38247 | 7/1999 |

*Primary Examiner*—Bentsu Ro
(74) *Attorney, Agent, or Firm*—Thomas G. Walsh; Graybeal Jackson Haley LLP

(57) ABSTRACT

This invention is a back EMF permanent electromagnetic motor generator and method using a regauging process for capturing available electromagnetic energy in the system. The device is comprised of a rotor with magnets of the same polarity; a timing wheel in apposition to a magnetic Hall Effect pickup switch semiconductor; and a stator comprised of two bars connected by a permanent magnet with magnetized pole pieces at one end of each bar. There are input and output coils created by wrapping each bar with a conducting material such as copper wire. Energy from the output coils is transferred to a recovery rectifier or diode. The magnets of the rotor, which is located on a shaft along with the timing wheel, are in apposition to the magnetized pole pieces of the two bars. The invention works through a process of regauging, that is, the flux fields created by the coils is collapsed because of a reversal of the magnetic field in the magnetized pole pieces thus allowing the capture of available back EMP energy. Additional available energy may be captured and used to re-energize the battery, and/or sent in another direction to be used as work. As an alternative, the available back EMF energy may be dissipated into the system.

10 Claims, 3 Drawing Sheets

U.S. PATENT DOCUMENTS

| | | |
|---|---|---|
| 5,369,325 A | 11/1994 | Nagate et al. |
| 5,371,426 A | 12/1994 | Nagate et al. |
| 5,451,825 A | 9/1995 | Strohm |
| 5,508,575 A | 4/1996 | Elrod, Jr. |
| 5,514,923 A | 5/1996 | Gossler et al. |
| 5,528,113 A * | 6/1996 | Boys et al. ............... 318/16 |
| 5,532,532 A | 7/1996 | DeVault et al. |
| 5,731,645 A * | 3/1998 | Clifton et al. ............ 310/74 |
| 6,118,202 A * | 9/2000 | Pinkerton ................ 310/178 |

* cited by examiner

DEVICE AND METHOD OF A BACK EMF PERMANENT ELECTROMAGNETIC MOTOR GENERATOR

BACKGROUND OF THE INVENTION

1. Field of the Invention

The invention relates generally to the capturing of electromagnetic energy using a method and device to create back EMF (electromagnetic force) and re-phasing of the back EMF to recycle and capture the available back EMF energy. Back EMF is also referred to as regauging and may be defined as energy created by the magnetic field from coils, and only by coils, and not by magnets.

2. Background Information and Related Art

Operation of a normal magnetic motor has the rotor pole attracting the stator pole, resulting in the generation of power from the magnets to the rotor and flywheel. During this phase, energy flows from the magnetics to the rotor/flywheel and is stored in the increased rotation. A rotor pole leaving a stator pole and creating a condition of drag-back results in power having to be put back into the magnetic section by the rotor and flywheel to forcibly overcome the drag-back. In a perfect, friction-free motor, the net force field is therefore referred to as most conservative. In other words, a most conservative EMF motor has maximum efficiency. Without extra energy continually fed to the motor, no net work can be done by the magnetic field, since half the time the magnetic field adds energy to the load (the rotor and flywheel) and the other half of the time it subtracts energy back from the load (the rotor and flywheel). Therefore the total net energy output is zero in any such rotary process without additional energy input. To use a present day magnetic motor, continuous energy must be input into the motor to overcome drag-back and to power the motor and its load.

Present EMF motors and generators all use such conservative fields and therefore, have internal losses. Hence, it is necessary to continually input all of the energy that the motor outputs to the load, plus more energy to cover losses inside the motor itself. EMF motors are rated for efficiency and performance by how much energy input into the motor actually results in output energy to the load. Normally, the Coefficient of Performance (COP) rating is used as a measure of efficiency. The COP is the actual output energy going into the load and powering it, divided by the energy that must be input into the device with its load. COP is the power out into the load, divided by the power input into the motor/load combination. If there were zero internal losses in a motor, that "perfect" motor would have a coefficient of performance (COP) equal to 1.0. That is, all energy input into the motor would be output by the motor directly into the load, and none of the input energy would be lost or dissipated in the motor itself.

In magnetic motor generators presently in use, however, due to friction and design flaws, there are always internal losses and inefficiencies. Some of the energy input into the motor is dissipated in these internal losses. As a consequence, the energy that gets to the load is always less than the input energy. So a standard motor operates with a COP of less than 1.0 which is expressed as COP<1.0. An inefficient motor may have a COP=0.4 or 0.45, while a specially designed, highly efficient motor may have a COP=0.85.

The conservative field inside of a motor itself can be divided into two phases. Producing a conservative field involves net symmetry between the "power out" phase from the magnetics to the rotor/flywheel and the "power back in" phase from the rotor/flywheel back to the magnetics. That is, the two flows of energy (one from the magnetics into the rotor and flywheel, and one from the rotor and flywheel back to the magnetics) are identical in magnitude but opposite in direction. Each phase alone is said to be "asymmetrical"; that is, it either has: 1) a net energy flow out to the rotor/flywheel; or 2) a net energy flow back into the magnetics from the rotor/flywheel. In simplified terms, it is referred to as "power out" and "power back in" phases with respect to the motor magnetics. Hence, the two asymmetrical phases are: 1) the power-out phase; and 2) the "power back in" phase, with reference to the magnetics.

For the power-out phase, energy is derived from the EMF existing between the stator pole and incoming rotor pole in an attraction mode. In this phase, the rotary motion (angular momentum and kinetic energy) of the rotor and flywheel is increased. In short, power is added to the rotor/flywheel (and thus to the load) from the fields between stator pole and rotor pole (the electromagnetic aspects of the system).

For the "power back in" phase, energy must be fed back into the magnetics from the rotor and flywheel (and the load) to overcome the drag-back forces existing between stator pole and outgoing rotor pole. In this phase, energy is returned back to the internal magnetic system from the rotary motion of the rotor and flywheel (the angular momentum, which is the rotational energy×time). As is well known in physics, a rotor/flywheel's angular momentum provides a convenient way to store energy with the spinning rotor/flywheel mass acting as an energy reservoir.

All present day conventional magnetic motors use various methods for overcoming and partially reversing back EMF. Back EMF is the return pulse from the coil out of phase and is also referred to as regauging. The back EMF is shorted out and the rotor is attracted back in, therefore eliminating back drag. This can be accomplished by pouring in more energy, which overpowers the back EMF, thereby producing a forward EMP in that region. The energy required for this method must be furnished by the operator.

The motor of the present invention uses only a small amount of energy to "trigger" a much larger input of available energy by supplying back EMF, thus increasing the potential energy of the system. It then utilizes this excess potential energy to reduce or reverse back EMF, thereby increasing the efficiency of the motor and, therefore, the COP.

If the energy in phase 1 (the power-out phase) is increased by additional available energy in the electromagnetics themselves, then the energy in phase 1 can be made greater than the energy in phase 2 (the power-back-in phase) without the operator furnishing the energy utilized. This produces a non-conservative net field. Net power can then be taken from the rotating stator and flywheel, because the available energy added into the stator and flywheel by the additional effects, is transformed by the rotor/flywheel into excess angular momentum and stored as such. Angular momentum is conserved at all times; but now some of the angular momentum added to the flywheel is evoked by additional effects in the electromagnetics rather than being furnished by the operator.

Electrodynamicists assume that the potential available energy of any system can be changed at will and without cost. This is back EMF and is well-known in physics. It is also routinely employed by electrodynamicists in the theoretical aspects. But to simplify the mathematics, electrodynamicists will create a back EMF twice simultaneously, each back EMF carefully selected just so that the two available forces that are produced are equal and opposite and cancel each other "symmetrically". This is referred to as "symmetrical back EMF". A symmetrical back EMF system cannot produce a COP>1.0.

On the other hand, the motor of the present invention deliberately creates a back EMF itself and its potential energy only once at a time, thereby retaining each extra force for a period of time and applying it to increase the angular momentum and kinetic energy of the rotor and flywheel. Specifically, this back EMF energy with its net force is deliberately applied in the motor of the present invention to overcome and even reverse the conventional drag-back (the back EMF). Hence less energy must be taken from the rotor and flywheel to overcome the reduced back EMF, and in the ideal case none is required since the back EMF has been overpowered and converted to forward EMF by the back EMF energy and force. In the motor of the present invention, the conventional back-drag section of the magnetics becomes a forward-EMF section and now adds energy to the rotor/flywheel instead of subtracting it. The important feature is that the operator only pays for the small amount of energy necessary to trigger the back EMF, and does not have to furnish the much larger back EMF energy itself.

When the desired energy in phase 1 (the power out phase) is thus made greater than the undesired "drag-back" energy in phase 2, then part of the output power normally dragged back from the rotor and flywheel by the fields in phase 2 is not required. Hence, additional power compared to the system (without the special back EMF mechanisms) is available from the rotor/flywheel. The rotor maintains additional angular momentum and kinetic energy, compared to a system which does not produce back EMF itself. Consequently, the excess angular momentum retained by the rotor and flywheel can be utilized as additional shaft power to power an external load connected to the shaft.

A standard magnetic motor operates as the result of the motor being furnished with external energy input into the system by the operator to reduce phase 2 (power back into the magnetics from the rotor/flywheel) by any of several methods and mechanisms. The primary purpose of this external energy input into the system is to overcome the back EMF and also provide for the inevitable energy losses in the system. There is no input of energy separate from the operator input. Therefore, the COP of any standard magnetic motor is COP less than 1.0. The efficiency of a standard magnetic motor varies from less than 50% to a maximum of about 85%, and so has a COP<1.0. When nothing is done in the motor that will produce a reduction of the back EMF without the operator inputting all the energy for it, then for even a frictionless, ideal permanent magnet motor, the COP can never exceed 1.0.

Until the introduction of the motor of the present invention, it has been standard universal practice that the operator must furnish all energy used to reduce the back EMF, provide for the internal losses, and power the load. It is therefore a common belief by the scientific community that an ideal (loss-less) permanent magnet motor cannot exceed COP=1.0. And that is true, so long as the operator himself must furnish all the energy. Further, since real permanent magnetic motors have real internal losses, some of the input energy is always lost in the motor itself, and that lost energy is not available for powering the rotor/flywheel and load. Hence a real permanent magnetic motor of the conventional kind will always have a COP<1.0.

The common assumption that the COP of a motor is limited to less than 1.0 is not necessarily true, and that COP>1.0 is permitted without violating the laws of nature, laws of physics, or laws of thermodynamics. However, it can immediately be seen that any permanent magnet motor exhibiting a COP>1.0 must have some available energy input returning in the form of back EMF.

A problem relates to how back EMF energy can be obtained from a circuit's external environment for the specific task of reducing the back-drag EMF without the operator having to supply any input of that excess energy. In short, the ultimate challenge is to find a way to cause the system to: 1) become an open dissipative system, that is, a system receiving available excess energy from its environment, in other words, from an external source; and 2) use that available excess energy to reduce the drag-back EMF between stator and rotor poles as the rotor pole is leaving the stator pole. If this objective can be accomplished, the system will be removed from thermodynamic equilibrium. Instead, it will be converted to a system out-of-thermodynamic equilibrium. Such a system is not required to obey classical equilibrium thermodynamics.

Instead, an out-of-equilibrium thermodynamic system must obey the thermodynamics of open systems far from the established and well-known parameters of thermodynamic equilibrium. As is well known in the physics of thermodynamics, such open systems can permissibly: 1) self-order; 2) self-oscillate; 3) output more back EMF energy than energy input by the operator (the available excess back EMF energy is received from an external source and some energy is input by the operator as well); 4) power itself as well as its loads and losses simultaneously (in that case, all the energy is received from the available external source and there is no input energy from the operator); and 5) exhibit negentropy, that is, produce an increase of energy that is available in the system, and that is independent of the energy put into the system by the operator. As a definition, entropy roughly corresponds to the energy of a system that has become unavailable for use. Negentropy corresponds to additional energy of a system that has become available for use.

In the back EMF permanent magnet electromagnetic motor generator of the present invention, several known processes and methods are utilized which allow the invention to operate periodically as an open dissipative system (receiving available excess energy from back EMF) far from thermodynamic equilibrium, whereby it produces and receives its excess energy from a known external source.

A method is utilized to temporarily produce a much larger source of available external energy around an energized coil. Then the unique design features of this new motor provides a method and mechanism that can immediately produce a second increase in that energy, concurrently as the energy flow is reversed. Therefore, the motor is capable of producing two asymmetrical back EMFs, one after the other, of the energy within a single coil, which dramatically increases the energy available and causes that available excess energy to then enter the circuit impulsively, being collected and utilized.

The present motor utilizes this available excess back EMF energy to overcome and even reverse the back-drag EMF between stator pole and rotor pole, while furnishing only a small trigger pulse of energy necessary to control and activate the direction of the back EMF energy flow.

By using a number of such dual asymmetrical self back EMFs for every revolution of the rotor, the rotor and flywheel collectively focus all the excess impulsive inputs into increased angular momentum (expressed as energy× time), shaft torque, and shaft power.

Further, some of the excess energy deliberately generated in the coil by the utilization of the dual process manifests in the form of excess electrical energy in the circuit and is utilized to power electrical loads, e.g., a lamp, fan, motor, or other electrical devices. The remainder of the excess energy generated in the coil can be used to power the rotor and flywheel, with the rotor/flywheel also furnishing shaft horsepower for powering mechanical loads.

This new and unique motor utilizes a means to furnish the relatively small amount of energy to initiate the impulsive asymmetrical self back EMF actions. Then part of the available excess electrical power drawn off from the back EMFs is utilized to recharge the battery with dramatically increased over voltage pulses.

The unique design features of this motor utilize both north and south magnetic poles of each rotor and stator magnet. Therefore, the number of impulsive self back EMFs in a single rotation of the rotor is doubled. Advanced designs increase the number of self back EMFs in a single rotor rotation with the result that there is an increase in the number of impulses per rotation which increase the power output of this new motor.

The sharp voltage pulse produced in the coil of this new motor by the rapidly collapsing field in the back EMF coil is connected to a battery in charge mode and to an external electrical load. The net result is that the coil asymmetrically creates back EMF itself in a manner adding available energy and impulse to the circuit. The excess available energy collected in the coil is used to reverse the back-EMF phase of the stator-rotor fields to a forward EMF condition, impulsively adding acceleration and angular momentum to the rotor and flywheel. At the same time, a part of the excess energy collected in the coil is used to power electrical loads such as charging a battery and operating a lamp or such other device.

It is well known in the art that changing the voltage alone creates a back EMF and requires no work. This is because to change the potential energy does not require changing the form of that potential energy, but only its magnitude. Work is rigorously the changing of the form of energy. Therefore, as long as the form of the potential energy is not changed, the magnitude can be changed without having to perform work in the process. The motor of the present invention takes advantage of this permissible operation to create back EMF asymmetrically, and thereby change its own usable available potential energy.

In an electric power system, the potential (voltage) is changed by inputing energy to do work on the internal charges of the generator or battery. This potential energy is expended within the generator (or battery) to force the internal charges apart, forming a source dipole. Then the external closed circuit system connected to that source dipole ineptly pumps the spent electrons in the ground line back through the back EMP of the source dipole, thereby scattering the charges and killing the dipole. This shuts off the energy flow from the source dipole to the external circuit. As a consequence of that conventional method, it is a requirement to input and replace additional energy to again restore the dipole. The circuits currently utilized in most electrical generators have been designed to keep on destroying the energy flow by continually scattering all of the dipole charges and terminating the dipole. Therefore, it is necessary to keep on inputing energy to the generator to keep restoring its source dipole.

An investigation of particle physics is required to see what furnishes the energy to the external circuit. Since neither a battery nor a generator furnishes energy to the external circuit, but only furnishes energy to form the source dipole, a better understanding of the electric power principle is required to fully understand how this new motor functions. A typical battery uses its stored chemical energy to form the source dipole. A generator utilizes its input shaft energy to rotate, forming an internal magnetic field in which the positive charges are forced to move in one direction and the negative charges in the reverse direction, thereby forming the source dipole. In other words, the energy input into the generator does nothing except form the source dipole. None of the input energy goes to the external circuit. If increased current is drawn into the external load, there also is increased spent electron flow being rammed back through the source dipole, destroying it faster. Therefore, dipole-restoring-energy has to be inputed faster. The chemical energy of the battery also is expended only to separate its internal charges and form its source dipole. Again, if increased current and power is drawn into the external load, there is increased spent electron flow being rammed back through the source dipole, destroying it faster. This results in a depletion of the battery's stored energy faster, by forcing it to have to keep restoring the dipole faster.

Once the generator or battery source dipole is formed (the dipole is attached also to the external circuit), it is well known in particle physics that the dipole (as is any charge) is a broken symmetry in the vacuum energy flux. By definition, this means that the source dipole extracts and orders part of that energy received from its vacuum interaction, and pours that energy out as the energy flowing through all space surrounding the external conductors in the attached circuit. Most of this enormous energy flow surging through space surrounding the external circuit does not strike the circuit at all, and does not get intercepted or utilized. Neither is it diverged into the circuit to power the electrons, but passes on out into space and is just "wasted". Only a small "sheath" of the energy flow along the surface of the conductors strikes the surface charges in those conductors and is thereby diverged into the circuit to power the electrons. Standard texts show the huge available but wasted energy flow component, but only calculate the small portion of the energy flow that strikes the circuit, is caught by it, and is utilized to power it.

In a typical circuit, the huge available but "wasted" component of the energy flow is about $10^{13}$ times as large as is the small component intercepted by the surface charges and diverged into the circuit to power it. Hence, around every circuit and circuit element such as a coil, there exists a huge non-intercepted, non-diverged energy flow that is far greater than the small energy flow being diverted and used by the circuit or element.

Thus there exists an enormous untapped energy flow immediately surrounding every EMF power circuit, from which available excess energy can be intercepted and collected by the circuit, if respective non-linear actions are initiated that sharply affect and increase the reaction cross section of the circuit (i.e., its ability to intercept this available but usually wasted energy flow).

The method in which the motor of the present invention alters the reaction cross section of the coils in the circuit, is by a novel use, which momentarily changes the reaction cross section of the coil in which it is invoked. Thus, by this new motor using only a small amount of current in the form of a triggering pulse, it is able to evoke and control the immediate change of the coil's reaction cross section to this normally wasted energy flow component. As a result, the motor captures and directs some of this usually wasted environmental energy, collecting the available excess energy in the coil and then releasing it for use in the motor. By timing and switching, the innovative gate design in this new motor directs the available excess energy so that it overcomes and reverses the return EMF of the rotor-stator pole combination during what would normally be the back EMF and demonstrates the creation of the second back EMF of the system. Now instead of an "equal retardation" force being produced in the back EMF region, a forward EMF is produced that is additive to the rotor/flywheel energy and not subtractive. In short, it further accelerates the rotor/flywheel.

This results in a non-conservative magnetic field along the rotor's path. The line integral of the field around that path (i.e., the net work on the rotor/flywheel to increase its energy and angular momentum) is not zero but a significant amount. Hence, the creation of an asymmetrical back EMF impulse magnetic motor: 1) takes its available excess energy from a known external source, the huge usually non-intercepted portion of the energy flow around the coil; 2) further increases the source dipolarity by this back EMF energy; and 3) produces available excess energy flow directly from the source dipole's increased broken symmetry in its fierce energy exchange with the local vacuum.

No laws of physics or thermodynamics are violated in the method and device of the present invention, and conservation of energy rigorously applies at all times. Nonetheless, by operating as an open dissipative system not in thermodynamic equilibrium with the active vacuum, the system can permissibly receive available excess energy from a known environmental source and output more energy to a load than must be input by the operator alone. As an open system not in thermodynamic equilibrium, this new and unique motor can tap in on back EMF to energize itself, loads and losses simultaneously, fully complying with known laws of physics and thermodynamics.

A search of prior art failed to reveal any devices that recycle available energy from back EMF of a permanent electromagnetic motor generator as described in the present invention. However, the following prior art patents were reviewed:

1. U.S. Pat. No. 5,532,532 to DeVault, et al., Hermetically Sealed Super-conducting Magnet Motor.
2. U.S. Pat. No. 5,508,575 to Elrod, Jr., Direct Drive Servovalve Having Magnetically Loaded Bearing.
3. U.S. Pat. No. 5,451,825 to Strohm, Voltage Homopolar Machine.
4. U.S. Pat. No. 5,371,426 to Nagate et al., Rotor For Brushless Motor.
5. U.S. Pat. No. 5,369,325 to Nagate et al., Rotor For Brushless Electromotor And Method For Making Same.
6. U.S. Pat. No. 5,356,534 to Zimmermann, deceased et al., Magnetic-Field Amplifier.
7. U.S. Pat. No. 5,350,958 to Ohnishi, Super-conducting Rotating Machine, A Super-conducting Coil, And A Super-conducting Generator For Use In A Lighting Equipment Using Solar Energy.
8. U.S. Pat. No. 5,334,894 to Nakagawa, Rotary Pulse Motor.
9. U.S. Pat. No. 5,177,054 to Lloyd, et al., Flux Trapped Superconductor Motor and Method.
10. U.S. Pat. No. 5,130,595 to Arora, Multiple Magnetic Paths Pulse Machine.
11. U.S. Pat. No. 4,980,595 to Arora, Multiple Magnetics Paths Machine.
12. U.S. Pat. No. 4,972,112 to Kim, Brushless D.C. Motor.
13. U.S. Pat. No. 4,916,346 to Kliman, Composite Rotor Lamination For Use In Reluctance Homopolar, And Permanent Magnet Machines.
14. U.S. Pat. No. 4,761,590 to Kaszman, Electric Motor.
15. U.S. Pat. No. 4,536,230 to Landa, et al., Anisotropic Permanent Magnets.
16. U.S. Pat. No. Re. 31,950 to Binns, Alternating Current Generators And Motors.
17. U.S. Pat. No. 4,488,075 to DeCesare, Alternator With Rotor Axial Flux Excitation.
18. U.S. Pat. No. 4,433,260 to Weisbord et al., Hysteresis Synchronous Motor Utilizing Polarized Rotor.
19. U.S. Pat. No. 4,429,263 to Muller, Low Magnetic Leakage Flux Brushless Pulse Controlled D-C Motor.
20. U.S. Pat. No. 4,423,343 to Field, II, Synchronous Motor System.
21. U.S. Pat. No. 4,417,167 to Ishii et al., DC Brushless Motor.
22. U.S. Pat. No. 4,265,754 to Menold, Water Treating Apparatus and Methods.
23. U.S. Pat. No. 4,265,746 to Zimmermann, Sr. et al. Water Treating Apparatus and Methods.
24. U.S. Pat. No. 4,222,021 to Bunker, Jr., Magnetic Apparatus Appearing To Possess a Single Pole.
25. U.S. Pat. No. 2,974,981 to Vervest et al., Arrester For Iron Particles.
26. U.S. Pat. No. 2,613,246 to Spodig, Magnetic System.
27. U.S. Pat. No. 2,560,260 to Sturtevant et al., Temperature Compensated Magnetic Suspension.

SUMMARY OF THE INVENTION

The device and method of the present invention is a new permanent electromagnetic motor generator that recycles back EMF energy (regauging) thus allowing the motor to produce an energy level of COP=0.98, more or less, depending upon configuration, circuitry, switching elements and the number and size of stators, rotors and coils that comprise the motor. The rotor is fixed between two pole pieces of the stator. The motor generator is initially energized from a small starter battery means, analogous to a spark plug, that sends a small amount of energy to the motor, thus stimulating a rotating motion from the rotor. As the rotor rotates, energy is captured from the surrounding electromagnetic field containing an asymmetrical pulse wave of back EMF. The energy produced and captured can be directed in one of several directions, including returning energy to the initial starter battery, rotating a shaft for work and/or sending a current to energize a fan, light bulb or other such device.

DETAILED DESCRIPTION OF THE INVENTION

Figure 1:
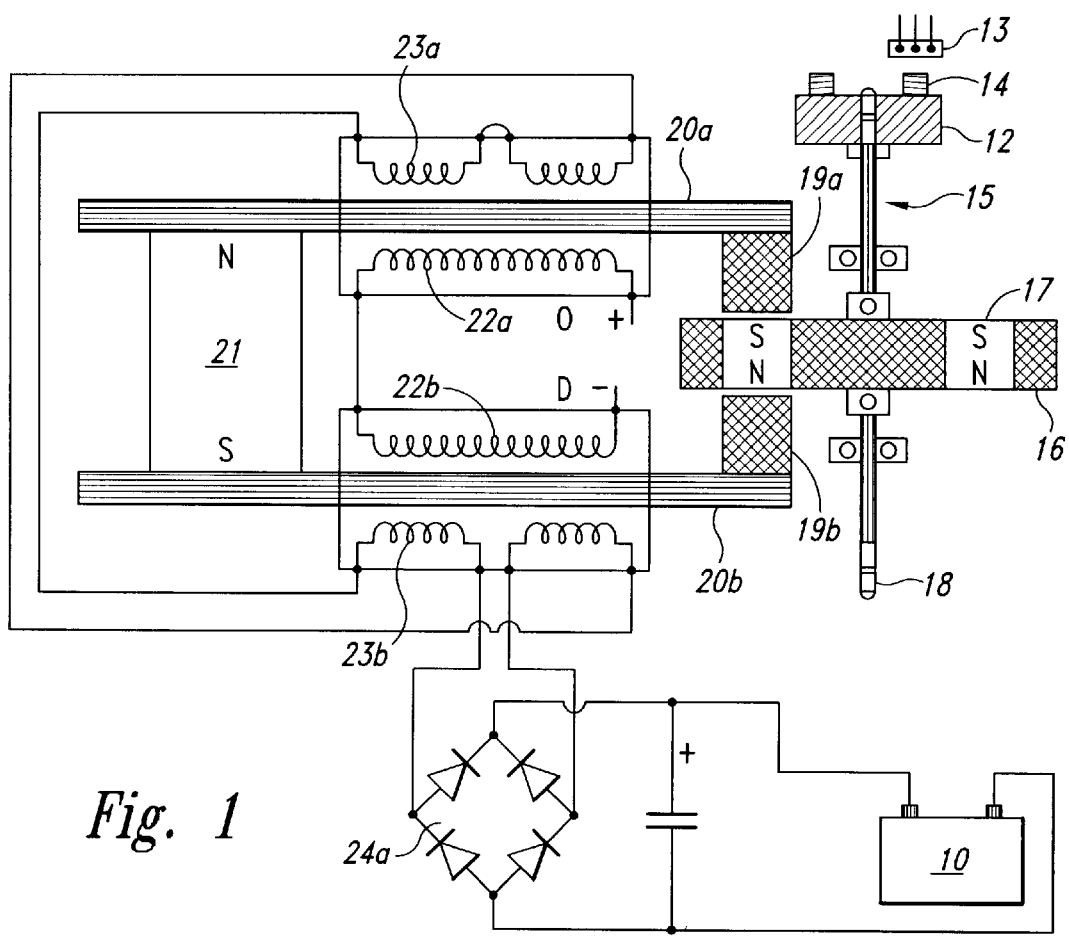
FIG. 1 is a top perspective view of a back EMF permanent electromagnetic motor generator with a single stator and a single rotor.

The present invention is a device and method for creating a back EMF permanent electromagnetic motor generator. As described in the Background Information, this new motor generator conforms to all applicable electrodynamic laws of physics and is in harmony with the law of the conservation of energy, the laws of electromagnetism and other related natural laws.

The back EMF permanent electromagnetic motor generator is comprised of combination of electrical, material and magnetic elements to capture available electromagnetic energy (back EMF) in a recovery rectifier or single diode from output coils. The capturing of back EMF energy is also known as regauging in the art. As an arbitrary starting point in describing this invention, an input battery, as a means of energy, sends power through a power on-off switch and then to a means for timing such as a magnetic timing switch (Hall Effect magnetic pickup switch, a semiconductor) which interfaces with or is in apposition to a magnet on a timing wheel. The timing wheel may contain any number of magnets of one or more, with the South polarity facing outward and in apposition with the Hall Effect pickup switch. The timing wheel is mounted at the end of a shaft that also runs through the center midline of a rotor containing any number of magnets of two or more. The rotor magnets are arranged in a manner wherein they have the same polarity and are equidistant from each other. The shaft has the timing wheel mounted at one end, the rotor, and then a means for work, such as a power take off at the opposite end. However, there are other embodiments in which the position of the rotor, timing wheel and power take-off have other arrangements. The rotor is stabilized to a platform or housing means and is fixed in a stationary position within a stator.

The stator is comprised of a permanent magnet connected to a means for conducting electromagnetic energy such as two parallel bars, each bar having a magnetized pole piece at one end of each bar. The conduction material of the bar may be ferrous, powdered iron, silicon steel, stainless magnetic steel, laminations of conductive material or any other magnetic conductive material. Each bar is wrapped in a conducting means to form an input coil. The means for conducting may be copper, aluminum or any other conductive material suitable for making a coil. The primary or input coil is connected to the switching circuit. A second conductive wrapping on top of the input coil becomes a secondary or output coil. The secondary or output coil is connected to the recovery circuit. The rotor is symmetrically located between the pole pieces of the bars of the stator and contains a series of magnets all having the same polarity, North or South, with each magnet in the rotor being in apposition to the pole piece as the rotor is in rotation around the shaft.

When the rotor is energized from the battery of the switching circuit, there is an initial magnetic field that is instantly overcome as the magnetized pole pieces are in apposition with the rotor magnets. As the rotor begins to move, increasing electromagnetic energy is produced as a result of flux gaiting from the apposed magnets of the rotor and pole pieces. The coils surrounding the bars "buck" the permanent magnet connecting the bars. This is known in the art as the "buck boosting" principle. When the permanent magnet is bucked by the coils, it reverses the polarity of the pole pieces which are apposed to the rotor magnets causing the rotor to increase its rotation or spin. The energy available from the fields that are collapsing in the primary and secondary coils, which creates the back EMF within the system, is now in non-equilibrium. Through circuitry and a switching means, energy can be put back into the system. Available energy captured from the back EMF, may be applied in different directions, including re-energizing the input battery, storage in a capacitor, conversion by a recovery rectifier to be stored in the input battery, a capacitor or a secondary or recovery battery. Recovery rectifiers convert AC to DC. Available energy may be used to energize an electric bulb, fan or any other uses.

The shaft in the midline of the rotor can transfer energy in the form of work through a power take-off. The power take-off may be connected to any number of secondary shafts, wheels, gears and belts to increase or reduce torque.

This is a description of the basic invention, however, there are an innumerable number of combinations and embodiments of stators, rotors, Hall Effect magnetic pickup switches, coils, recovery rectifiers and electronic connecting modes that may be combined on a single shaft or several shafts connected in various combinations and sequences, and of various sizes. There may be any number of stators to one rotor, however, there can be only one rotor if there is a single stator. The number of Hall Effect pickup switches may vary, for example, in the case of multiple stators of high resistant coils, the coils may be parallel to form a low resistant coil so that one Hall Effect pickup with one circuit may fire all of the stators at the same time. The number of magnets in both the timing wheel and the rotor may also vary in number as well as the size and strength of the magnets in gauss units. All types of magnets may be used. The number of winds on both the input and output coils on each conducting bar may also vary in number and in conductive material.

The motor generator, as shown in FIG. 1, a top perspective view of a single stator, single rotor back EMF motor and is comprised of a means of providing energy, such as input battery 10 connected to power switch 11 (shown in FIG. 2) and Hall Effect magnetic pickup switch 13. Magnetic pickup 13 interfaces with timing wheel 12 to form a timing switch. Timing wheel 12 is comprised of four magnets 14 with the South pole of each said magnet facing outward to magnetic pickup 13. Timing wheel 12 is fixed at one end of shaft 15. Located on shaft 15 is rotor 16. Rotor 16 can be of any size, said rotor containing four rotor magnets 17. Said rotor magnets 17 are arranged in a manner so all have the same polarity. Opposite timing wheel 12 on shaft 15 is a means for work, such as a power take-off 18. Rotor 16 is mounted in a fixed position with rotor magnets 17 in apposition with magnetized pole pieces 19a and 19b. Each pole piece 19a and 19b is connected to iron bars 20a and 20b. Iron bars 20a and 20b are connected by a permanent magnet 21. A means for conduction is wrapped around iron bars 20a and 20b to form input coils 22a and 22b. Superimposed upon input coils 22a and 22b are output coils 23a and 23b. Output coils 23a and 23b are connected to full wave bridge first recovery rectifier 24a. First rectifier 24a is connected to battery 10.

Figures 1A, 1B:
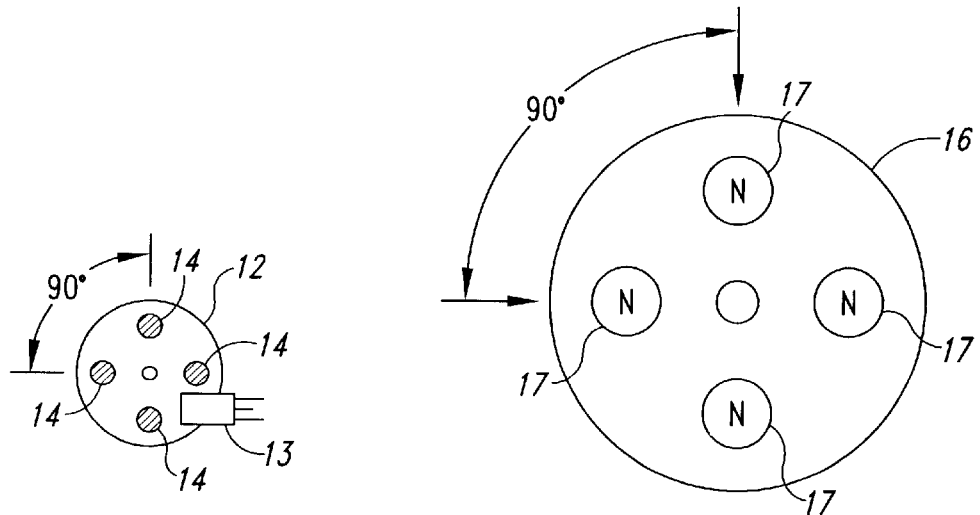
FIG. 1a is a side perspective view of a timing wheel and magnetic Hall Effect uptake switch of the back EMF motor generator.
FIG. 1b is a side perspective view of the rotor of the back EMF motor generator.

FIG. 1a is a perspective side view of the back EMF Motor Generator timing wheel 12 with Hall Effect magnetic pickup switch 13 in apposition individually to each of four magnets 14 as said timing wheel 12 rotates. Said magnets 14 have the South polarity facing outward with an equidistant separation of 90°.

FIG. 1b is a perspective side view of rotor 16 with four rotor magnets 17 with 900 equidistant separation and having the same polarity.

Figure 2:
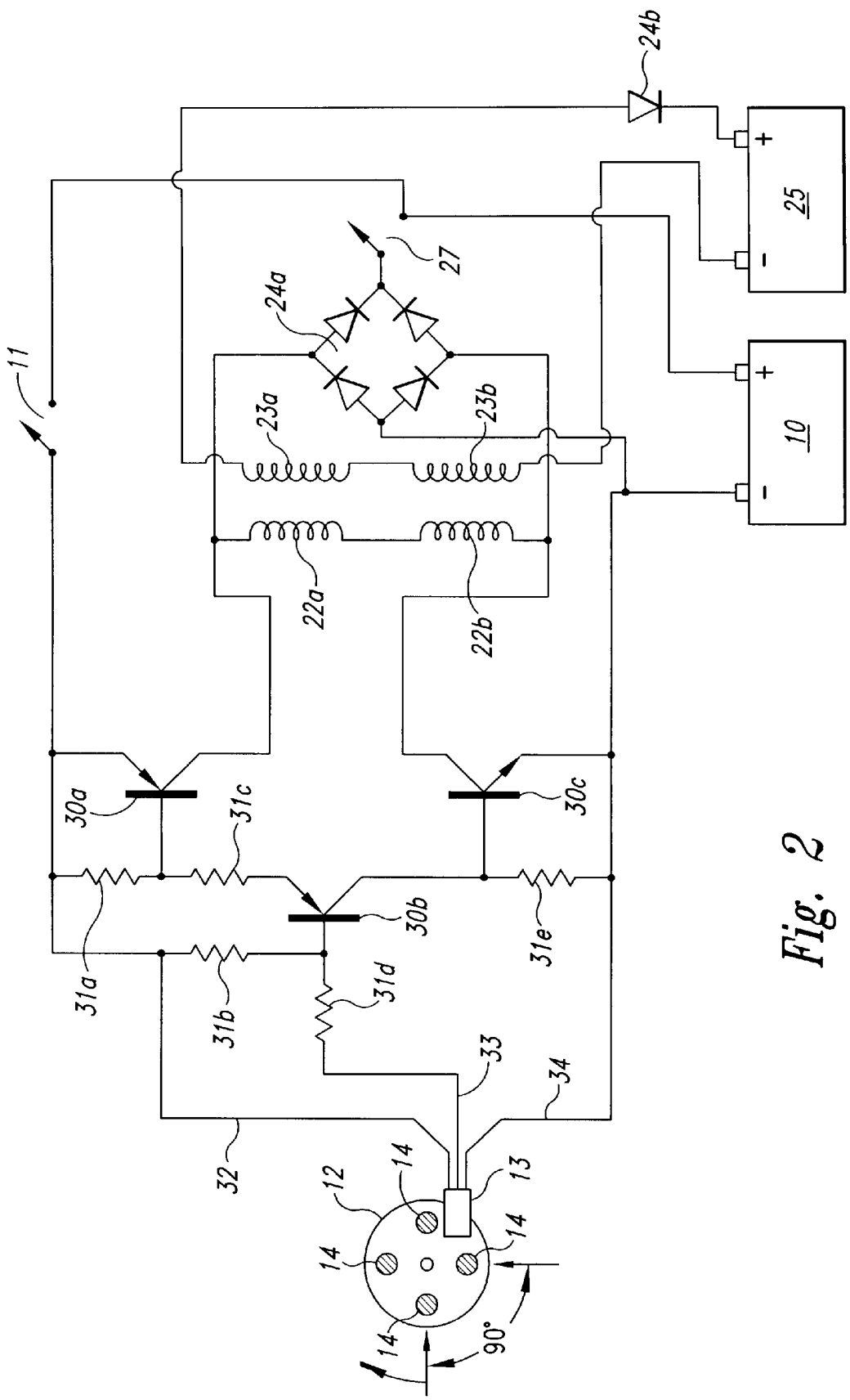
FIG. 2 is a schematic drawing incorporating circuitry for the back EMF motor generator.

FIG. 2 is a schematic diagram of the motor generator circuitry showing input coil connections from input battery 10 through power switch 11, transistors 30a,b, resistors 31a–d, through power supply lead 32 (VCC+) and to magnetic pickup 13. Magnetic pickup 13 is in apposition with timing wheel magnets 14 located on timing wheel 12. Off of magnetic pickup 13 is collector lead 33 and ground lead 34. When current is reversed, it flows through resistor 31e and transistor 30c to input battery 10. Input coils 22a,b send power to full wave bridge first recovery rectifier 24a which then sends power through switch recovery 27 back into the system, and/or to input battery 10. Output coils 23a and 23b send power through single diode second recovery rectifier 24b to recovery battery 25. In this particular embodiment, the value and type number of the components are as follows: Hall Effect magnetic pickup switch 13 is a No. 3020; transistor 30a is a No. 2N-2955; transistor 30b is a No. MPS-8599; and transistor 30c is a No. 2N-3055; resistors 31a and b are 470 ohms resistors; resistor 31b is a 2.2 K ohms resistor; resistor 31c is a 220 ohms resistor; resistor 31d is a 1 K ohms resistor; and recovery rectifier 24a is a 10 Amp, 400 volts bridge rectifier.

Figure 3:
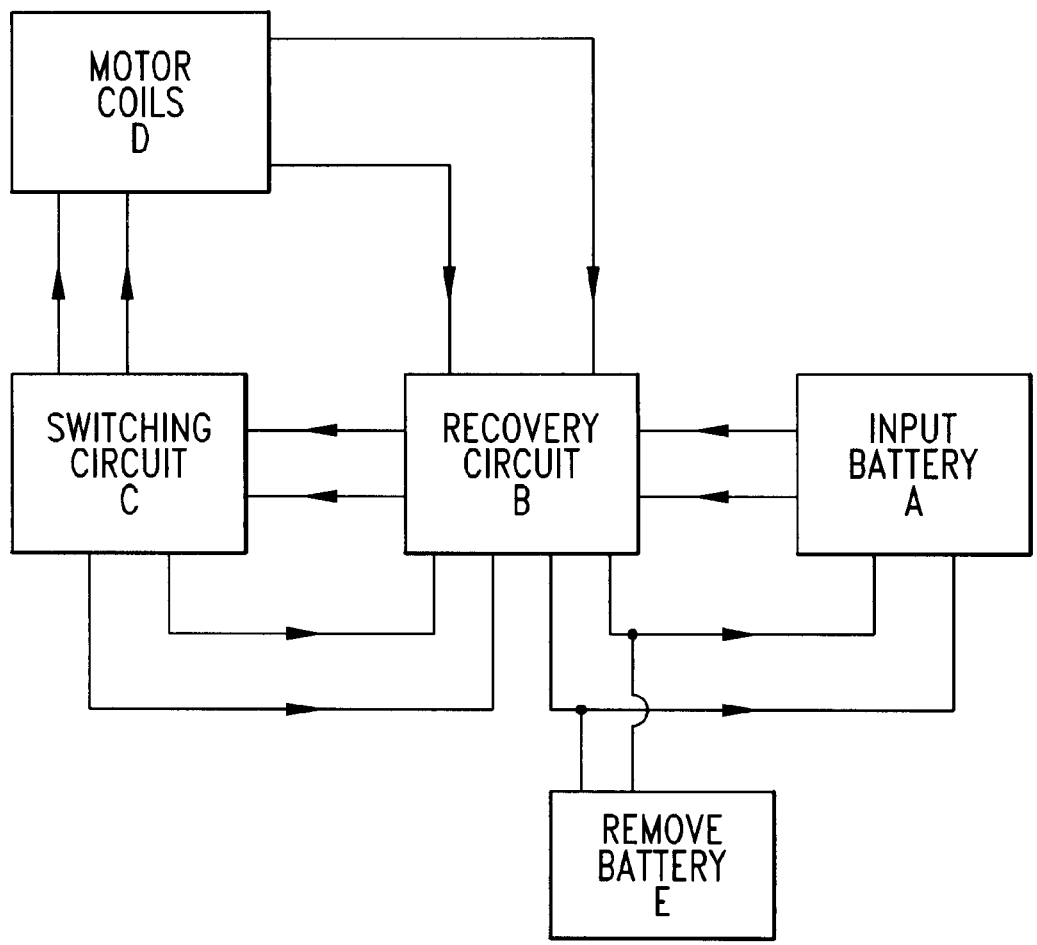
FIG. 3 is a box diagram showing the relationships of the back EMF motor generator circuitry.

FIG. 3 is a box diagram showing the flow of voltage from input battery A, through recovery circuit B, switching circuit C and motor coils D. Motor coils D send available back EMF energy through recovery circuit B, and from B to recovery battery E and input battery A. Available back EMF energy can also flow from switching circuit C to recovery circuit B.

In multiple stator/rotor systems, each individual stator may be energized one at a time or all of the stators may be energized simultaneously. Any number of stators and rotors may be incorporated into the design of such multiple stator/rotor motor generator combinations. However, while there may be several stators per rotor, there can only be one rotor for a single stator. The number of stators and rotors that would comprise a particular motor generator is dependent upon the amount of power required in the form of watts. The desired size and horse power of the motor determines whether the stators will be in parallel or fired sequentially by the magnetic Hall Effect pickup switch or switches. The number of magnets incorporated into a particular rotor is dependent upon the size of the rotor and power required of the motor generator. In a multiple stator/rotor motor generator, the timing wheel may have one or more magnets, but must have one magnet Hall Effect pickup switch for each stator if the stators are not arranged in parallel. The back EMF energy is made available through the reversing of the polarity of the magnetized pole pieces thus collapsing the field around the coils and reversing the flow of energy to the recovery diodes, which is capturing the back EMF.

Individual motors may be connected in sequence with each motor having various combinations of stators and rotors or in parallel. Each rotor may have any number of rotor magnets ranging from a minimum of 2 to maximum of 60. The number of stators for an individual motor may range from 1 to 60 with the number of conducting bars ranging from 2 to 120.

What distinguishes this motor generator from all others in the art is the presence of a permanent magnet connecting the two conducting bars which transfer magnetic energy through the pole pieces to the rotor, thereby attracting the rotor between the pole pieces. With the rotor attracted in between the two pole pieces, the coils switch the polarity of the magnetic field of the pole pieces so that the rotor is repelled out. Therefore there is no current and voltage being used to attract the rotor. The only current being used is the repulsion of the rotor between the two conductive bar pole pieces thereby requiring only a small amount of current to repel the rotor. This is known as a regauging system and allows the capturing of available back EMF energy for use.

Finally, although the invention has been described with reference of particular means, materials and embodiments, it is to be understood that the invention is not limited to the particulars disclosed and extends to all equivalents within the scope of the claims.

What is claimed is:

1. A back EMF permanent electromagnetic motor generator using a regauging process for capturing available electromagnetic energy in the system comprising:
   a. a means for producing a source of input energy to said motor generator, said energy conducted through a power switch and a magnetic timing switch;
   b. a means for timing said motor generator, having a timing wheel connected to a shaft, said timing wheel comprised of one or more magnets, said magnets arranged so that the South polarity faces outward and is in apposition with said timing switch;
   c. a rotor and a means for transferring a force on said shaft, said rotor containing magnets having the same polarity;
   d. a stator comprised of two bars made of a magnetic conductive means, said bars connected by a permanent magnet and having a pole piece at one end of each said bar, said pole pieces thereby magnetized and in apposition with magnets of said rotor, said rotor positioned between said pole pieces;
   e. an input coil comprised of a conductive material wrapped around each of said bars of said stator, said input coil connected to a circuit;
   f. an output coil comprised of a conductive material wrapped around each of said input coil of said bars, said output coils connected to a recovery rectifier or diode;
   g. said circuit for transferring electrical power, said circuit connecting said means for producing input energy to said power switch, said circuit comprising a pickup timing switch thereby providing an electronic voltage pulse to said circuit and then to said coils resulting in rotation of said rotor, said rotor turning said timing wheel to provide additional electronic voltage pulses to said circuit and then to said coils again, thereby providing a means for collecting available back EMF energy for storage, use or dissipation into the system.

2. The motor generator of claim 1, wherein said input producing means is a battery.

3. The motor generator of claim 1, wherein said magnetic timing switch is a Hall Effect magnetic pickup semiconductor.

4. The motor generator of claim 1, wherein the number of rotors may range from 1 to 60.

5. The motor generator of claim 1, wherein the number of magnets in said rotor has a range of 2 to 60.

6. The motor generator of claim 1, wherein said magnetic conductive means may be ferrous, powdered iron, silicon steel, stainless magnetic steel, laminations of a conductive material or any other magnetic conductive material.

7. The motor generator of claim 1, wherein the number of magnetic conductive bars has a range of 2 to 120.

8. The motor generator of claim 1, wherein said means for transferring a force on said shaft may be a power take-off mechanism, gears, flywheels, belts or other methods of transferring force for the purpose of doing work.

9. A back EMF permanent electromagnetic motor generator using a regauging process for capturing available electromagnetic energy in the system comprising:

a. a battery connected to a power switch and a Hall Effect magnetic pickup switch, said magnetic pickup switch in apposition with a timing wheel, said timing wheel on a shaft;

b. a rotor and a power take-off means on said shaft, said rotor having four magnets of the same polarity, said magnets equidistant from each other;

c. a stator, said stator comprised of two iron bars connected by a permanent magnet and wrapped in a first copper conducting material to form an input coil that is connected to a circuit, on top of said input coil, there is wrapped a second copper conducting material to form an output coil with said output coil connected to a recovery rectifier or single diode, said iron bars further having a pole piece at one of each end of said bars, said pole pieces in apposition to said magnets on said rotor;

d. a circuit for transferring electrical power, said circuit connecting said battery to said power switch, said circuit comprising-said Hall Effect pickup switch thereby providing an electronic voltage pulse through said circuit and then to said coils resulting in rotation of said rotor, said rotor turning said timing wheel to provide additional electronic voltage pulses to said coils again, thereby providing a means for collecting available back EMF energy for storage, use or dissipation into the system.

10. A method of producing a back EMF permanent electromagnetic motor generator using a regauging process comprising the steps of:

a. placing a rotor containing magnets of the same polarity on a shaft with a timing wheel on said shaft;

b. placing in apposition to said timing wheel a Hall Effect magnetic pickup switch;

c. placing in apposition to said magnets of said rotor magnetized pole pieces of a stator, said stator comprised of two conducting bars connected by a permanent magnet; input coil connected a circuit;

e. on top of said input coil, wrapping a second conducting material to form an output coil, said output coil connected to a recovery rectifier or a single diode;

f. connecting a circuit for transferring electrical power, said circuit connected to a battery and a power switch, said circuit comprising said Hall Effect magnetic pickup switch thereby providing an electronic voltage pulse to said circuit and then to said coils resulting in increase rotation of said rotor, said rotor turning said timing wheel to provide additional electronic pulses to said circuit and then to said coils again, thereby providing a means for collecting available back EMF energy for storage, use or dissipation into the system.

* * * * *

UNITED STATES PATENT AND TRADEMARK OFFICE
CERTIFICATE OF CORRECTION

PATENT NO.    : 6,392,370 B1
DATED         : May 21, 2002
INVENTOR(S)   : John C. Bedini It is certified that error appears in the above-identified patent and that said Letters Patent is hereby corrected as shown below:

Column 13,
Line 19, please delete the hyphen in between "comprising" and "said" and insert a space.

Column 14,
Line 11, after the semicolon, please delete "input coil connected a circuit;".
Line 12, please insert the following new paragraph:
--      d.      wrapping said bars with a first conducting material to form an input coil, said input coil connected to a circuit --.

Signed and Sealed this

Tenth Day of December, 2002

JAMES E. ROGAN
*Director of the United States Patent and Trademark Office*